(12) United States Patent
Gemmeke et al.

(10) Patent No.: US 8,370,409 B2
(45) Date of Patent: Feb. 5, 2013

(54) ELECTRONIC COMPUTING CIRCUIT FOR OPERAND WIDTH REDUCTION FOR A MODULO ADDER FOLLOWED BY SATURATION CONCURRENT MESSAGE PROCESSING

(75) Inventors: Tobias Gemmeke, Santa Clara, CA (US); Nicolas Maeding, Holzgerlingen (DE); Jochen Preiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1396 days.

(21) Appl. No.: 12/028,889

(22) Filed: Feb. 11, 2008

(65) Prior Publication Data

US 2010/0057825 A1  Mar. 4, 2010

(30) Foreign Application Priority Data

Feb. 13, 2007 (EP) ..................................... 07102221

(51) Int. Cl.
*G06F 7/00* (2006.01)

(52) U.S. Cl. .......... 708/200; 708/207; 708/498; 708/700
(58) Field of Classification Search .................. None
See application file for complete search history.

(56) References Cited

U.S. PATENT DOCUMENTS 6,499,046 B1 * 12/2002 Nguyen et al. ................ 708/552

* cited by examiner

*Primary Examiner* — Michael D Yaary
(74) *Attorney, Agent, or Firm* — Yee & Associates, P.C.

(57) ABSTRACT

A method for operand width reduction is described, wherein two N-bit input operands (A, B) of a bit width of N are processed and two M-bit output operands (A', B') of a reduced bit width of M are generated in a way, that a post-processing comprising an M-bit adder function followed by saturation to M bits performed on said two M-bit output operands (A', B') provides an M-bit result equal to an M-bit result of an N-bit modulo adder function of the two N-bit input operands (A, B), followed by a saturation to M bits. Further an electronic computing circuit (1, 5) is described performing said method. Additionally a computer system comprising such an electronic computing circuit is described.

7 Claims, 6 Drawing Sheets

| D(0:N-M+1) | Output | | | | | |
|---|---|---|---|---|---|---|
| | A'(0) | A'(1) | A'(2:M-1) | B'(0) | B'(1) | B'(2:M-1) |
| <-2 | 1 | 0 | | 1 | 0 | |
| -2 | 1 | A(N-M+1) | A(N-M+2:N-1) | 1 | B(N-M+1) | B(N-M+2:N-1) |
| -1 | 0 | A(N-M+1) | | 1 | B(N-M+1) | |
| 0 | 0 | A(N-M+1) | | 0 | B(N-M+1) | |
| >0 | 0 | 1 | | 0 | 1 | |

Fig. 3

| D(0:N-M+1) | Output | | | | | |
|---|---|---|---|---|---|---|
| | A'(0) | A'(1) | A'(2:M-1) | B'(0) | B'(1) | B'(2:M-1) |
| <-2 | 1 | 0 | A(N-M+2:N-1) | 1 | 0 | B(N-M+2:N-1) |
| -2 | 1 | A(N-M+1) | | 1 | B(N-M+1) | |
| -1 | 0 | A(N-M+1) | | 1 | B(N-M+1) | |
| 0 | 0 | A(N-M+1) | | 0 | B(N-M+1) | |
| >0 | sign | not sign | | sign | not sign | |

Fig. 6

ELECTRONIC COMPUTING CIRCUIT FOR OPERAND WIDTH REDUCTION FOR A MODULO ADDER FOLLOWED BY SATURATION CONCURRENT MESSAGE PROCESSING

BACKGROUND OF THE INVENTION

The invention lies within the field of computer chip design. More particularly, the invention relates to a method and an electronic computing circuit for operand width reduction for modulo adder followed by saturation.

In modern chip design the reduction of design time is a critical issue. Reuse of building blocks enables a reduction of design effort and design time. However, for different operations executed by a similar unit, specific instructions sometimes make a more complex design necessary. This especially applies for Single-Instruction-Multiple-Data (SIMD) units like e.g. Vector Multimedia Extension (VMX), Synergistic Processing Elements (SPE) or Supplemental Streaming SIMD Extensions 4 (SSE4) units. The data width, i.e. bit width, in these units is variable and depends on the instruction to be performed. The common bit widths are by the power of two, like 8, 16, 32, 64, etc. Operands and results are always of these bit widths.

In many cases during the calculation in the various compute units, intermediate results may not be presentable with the given bit width of the result. Intermediate calculation can demand to apply the modulo function, saturation or rounding based on the function performed. In these cases either the modulo function, saturation or rounding is applied on the intermediate result. These options add effort to the design as well as making an implementation inhomogeneous.

In some cases, even a combination of the above functions must be applied to intermediate results. For a final adder of a carry network, it is frequently required to first add with the modulo function to an intermediate bit width of N, followed by a saturation towards a smaller result bit width M. Such functionality can be required, e.g., in the final adder stage of a multiplier circuit that saturates the result to M bits.

An electronic computing circuit to perform these functions can be derived from EP 0 209 014 B1 by ignoring the carry output of the adder, i.e. using a modulo adder. A disadvantage of this micro architecture is that the adder device must be adapted to process input operands having a bit width of N. If other functions only need adders of the target width M this approach might increase the delay of these functions. Also, this approach disables a wider re-usage of existing designs or building blocks available for the target width M.

Up to now, no solution is known to perform such functionality within adder building blocks with a bit width equal to the bit width M of the result.

SUMMARY OF THE INVENTION

It is therefore an object of the invention to provide a method and an electronic computing circuit for operand width reduction for modulo adder followed by saturation for computing a function $A(0:N-1)+B(0:N-1) \pmod{2^N}$ and then saturate to M<N bits, wherein in order to perform this function an adder with a bit width of M can be used.

The object of the invention is met by an electronic computing circuit according to claim 1 and by a method for operand width reduction for a modulo adder followed by saturation according to claim 4.

In a first aspect, the invention provides an electronic computing circuit for operand width reduction processing two N-bit input operands A, B of a bit width of N and generating two M-bit output operands A', B' of a reduced bit width of M in a way, that a post-processing comprising an M-bit adder function followed by saturation to M bits performed on said two M-bit output operands provides an M-bit result equal to the M-bit result of an N-bit modulo addition of the two N-bit input operands followed by a saturation to M bits.

In order to re-use existing M-bit building blocks, the disclosed electronic computing circuit recodes the two N-bit input operands A and B to two M-bit output or intermediate operands A' and B' of a smaller bit width M such that the correct result can be computed with an M-bit adder followed by a saturation circuit with little or no modification. Thereby the M-bit adder followed by the saturation circuit processes the two output operands A' and B'. This is why the two output operands A' and B' can be seen as intermediate operands.

Doing so, the invention enables the usage of a common M-bit adder building block for an N-bit modulo add (M<N) of wider operands than the given result bit width M, while correctly saturating to the given result width M.

Thereby an additional logic outside of the M-bit adder building block converts the wider N-bit input operands in such a way, that the M-bit output operands provided to the common M-bit adder have the given bit width, e.g. result bit width, of the adder and are prepared in such a way, that the calculated saturated result of these narrower operation is equal to the saturated result of an N-bit adder, which would calculate the result on the wider N-bit input operands based on the modulo function and saturate afterwards to a bit width of M.

The ability to use an M-bit adder to perform a modulo adder function followed by saturation on two N-bit input operands reduces design effort, time and cost. The released design resources can be focused on improvements of the common adder. Improvements achieved in the design of the common adder by focusing the freed design resources on the common adder pay off for all the non-conform operations as well. Also, all operations using the adder only, benefit from the smaller bit width of the adder.

The electronic computing circuit according to the invention allows to compute a function $A(0:N-1)+B(0:N-1) \pmod{2^N}$ and then saturate to M<N bits, wherein in order to perform this function an adder with a bit width of M can be used.

Preferably said electronic computing circuit comprises
means for receiving said two N-bit input operands as an input,
means to generate said two M-bit output operands from said two N-bit input operands,
means to detect special saturation cases of said N-bit input operands or means for receiving the result of an external overflow sign calculation logic as input, and
means to provide an output comprising said two M-bit output operands allowing to correctly perform said post-processing on said two M-bit output operands.

According to a preferred embodiment of the electronic computing circuit, said means to detect saturation cases comprise means to compute a control signal indicating a special saturation case based on a portion of the N-bit input operands, wherein said means to provide an output comprising said two M-bit output operands allowing to correctly perform said post-processing on said two M-bit output operands provide the manipulated operands as well as the control signal indicating the special saturation case to an M-bit saturation adder, which calculates the correct M-bit result with a bit width of M while having an additional logic within its saturation logic that takes said control signal into account.

According to another preferred embodiment of the electronic computing circuit, said means to detect saturation cases of said N-bit input operands and said means to generate said two M-bit output operands from said two N-bit input operands comprise means to perform a recoding of the two N-bit input operands to the two M-bit output operands, wherein said recoding of the two N-bit input operands to the two M-bit output operands is performed by adding portions of the two N-bit input operands together and wherein based on the result of this addition and one or more bits of the two N-bit input operands the two M-bit output operands are computed.

Thereby said recoding of the two N-bit input operands to the two M-bit output operands can be performed by sign extending the two N-bit input operands by one bit and adding the (N−M+1) most significant bits (MSB) of these sign extended inputs together, wherein based on the result of this addition and the MSB of the two N-bit input operands the two MSB of the M-bit output operands are computed, wherein the M−2 least significant bits (LSB) of the two M-bit output operands are set to the M−2 LSB of the two M-bit input operands, wherein said control signal is detected based on the two MSB of the N-bit input operands and is used to revert the saturation direction in the saturate logic.

According to an additional preferred embodiment of the electronic computing circuit, said means to detect saturation cases of said N-bit input operands and said means to generate said two M-bit output operands from said two N-bit input operands comprise an external overflow sign calculation logic and means to perform a recoding of the two N-bit input operands to the two M-bit output operands, wherein portions of the two N-bit input operands are added together, wherein based on the result of this addition, the output of an external overflow sign calculation and one or more bits of the two N-bit input operands the two M-bit output operands are computed, wherein the means to provide an output comprising said two M-bit output operands allowing to correctly perform said post-processing on said two M-bit output operands provide the manipulated operands to an M-bit saturation adder, which calculates the correct M-bit result with a bit width of M by processing the two output operands.

According to a preferred embodiment of the electronic computing circuit, said means to detect saturation cases of said N-bit input operands and said means to generate said two M-bit output operands from said two N-bit input operands comprise an external overflow sign calculation logic and means to perform a recoding of the two N-bit input operands to the two M-bit output operands, wherein the two N-bit input operands are sign extended by one bit and the (N−M+1) MSB of these sign extended inputs are added together, wherein based on the result of this addition, the output of the external overflow sign calculation and the MSB of the two input operands the two MSB of the M-bit output operands are computed, wherein the M−2 LSB of the two output operands are set to the M−2 LSB of the two input operands.

In a second aspect, the invention provides a method for operand width reduction, wherein two N-bit input operands of a bit width of N are processed and two M-bit output operands of a reduced bit width of M are generated in a way, that a post-processing comprising an M-bit adder function followed by saturation to M bits performed on said two M-bit output operands provides an M-bit result equal to an M-bit result of an N-bit modulo adder function of the two N-bit input operands, followed by a saturation to M bits.

Said method according to the invention has the advantage over the state of the art, that it allows re-using an M-bit adder combined with a special handling of a saturation case.

In order to re-use existing M-bit building blocks, the disclosed method performs a recoding of the two N-bit input operands A and B to two M-bit output or intermediate operands A' and B' of a smaller bit width M such that the correct result can be computed with an M-bit adder followed by a saturation circuit with little or no modification.

The method according to the invention allows to compute a function A(0:N−1)+B(0:N−1) (mod $2^N$) and then saturate to M<N bits, wherein in order to perform this function an adder with a bit width of M can be used.

Said method preferably comprises the steps of:
receiving said two N-bit input operands as an input,
generating said two M-bit output operands from said two N-bit input operands,
detecting special saturation cases of said N-bit input operands or means for receiving the result of an external overflow sign calculation logic as input, and
providing an output comprising said two M-bit output operands allowing to correctly perform said post-processing on said two M-bit output operands.

A preferred embodiment of the method according to the invention is characterized in that detecting saturation cases for said N-bit input operands is performed by a computation of a control signal indicating a special saturation case based on a portion of the N-bit input operands, wherein providing an output comprising said two M-bit output operands allowing to correctly perform said post-processing on said two M-bit output operands is performed by providing the manipulated operands as well as the control signal indicating a special saturation case to an M-bit saturation adder, which calculates the correct M-bit result with a bit width of M while having an additional logic within its saturation logic taking said control signal into account.

Another preferred embodiment of the method according to the invention is characterized in that the detection of saturation cases of said N-bit input operands and the generation of said two M-bit output operands from said two N-bit input operands is performed by a recoding of the two N-bit input operands to the two M-bit output operands, wherein portions of the two N-bit input operands are added together, wherein based on the result of this addition and one or more bits of the two N-bit input operands the two M-bit output operands are computed.

An additional preferred embodiment of the method according to the invention is characterized in that said recoding of the two N-bit input operands to the two M-bit output operands is performed by sign extending said two N-bit input operands by one bit and adding the (N−M+1) most significant bits (MSB) of these sign extended inputs together, wherein based on the result of this addition and the MSB of the two N-bit input operands the two MSB of the M-bit output operands are computed, wherein the M−2 least significant bits (LSB) of the two M-bit output operands are set to the M−2 LSB of the two M-bit input operands, wherein said control signal is detected based on the two MSB of the N-bit input operands and is used to revert the saturation direction in the saturate logic.

A preferred embodiment of the method according to the invention is characterized in that the detection of saturation cases of said N-bit input operands and the generation of said two M-bit output operands from said two N-bit input operands is performed by an external overflow sign calculation and by a recoding of the two N-bit input operands o the two M-bit output operands, wherein a portion of the two N-bit input operands are added together, wherein based on the result of this addition, the output of an external overflow sign calculation and one or more bits of the two N-bit input operands the two M-bit output operands are computed, wherein the means to provide an output comprising said two M-bit output operands allowing to correctly perform said post-processing on said two M-bit output operands provide the manipulated operands to an M-bit saturation adder, which calculates the correct M-bit result with a bit width of M by processing the two output operands.

Another preferred embodiment of the method according to the invention is characterized in that the detection of saturation cases of said N-bit input operands and the generation of said two M-bit output operands from said two N-bit input operands is performed by an external overflow sign calculation and by a recoding of the two N-bit input operands to the two M-bit output operands, wherein the two N-bit input operands are sign extended by one bit and the (N−M+1) MSB of these sign extended inputs are added together, wherein based on the result of this addition, the output of the external overflow sign calculation and the MSB of the two input operands the two MSB of the M-bit output operands are computed, wherein the M−2 LSB of the two output operands are set to the M−2 LSB of the two input operands.

In an additional aspect, the invention provides a computer system comprising an electronic computing circuit mentioned above performing a method mentioned above.

BRIEF DESCRIPTION OF THE DRAWINGS

The foregoing, together with other objects, features, and advantages of this invention can be better appreciated with reference to the following specification, claims and drawings, with FIG. 1 a schematic block diagram representation of a first embodiment of an electronic computing circuit to be used to perform a first method according to the invention, FIG. 2 a detailed depiction of a recoding circuit that is part of the electronic computing circuit of FIG. 1, FIG. 3 a first table representing functions computed by circuits within the recoding unit of FIG. 2, FIG. 4 a schematic block diagram representation of a second embodiment of an electronic computing circuit to be used to perform a second method according to the invention, FIG. 5 a detailed depiction of a recoding circuit that is part of the electronic computing circuit of FIG. 4, FIG. 6 a second table representing functions computed by circuits within the recoding unit of FIG. 5,

DETAILED DESCRIPTION

Figure 1:
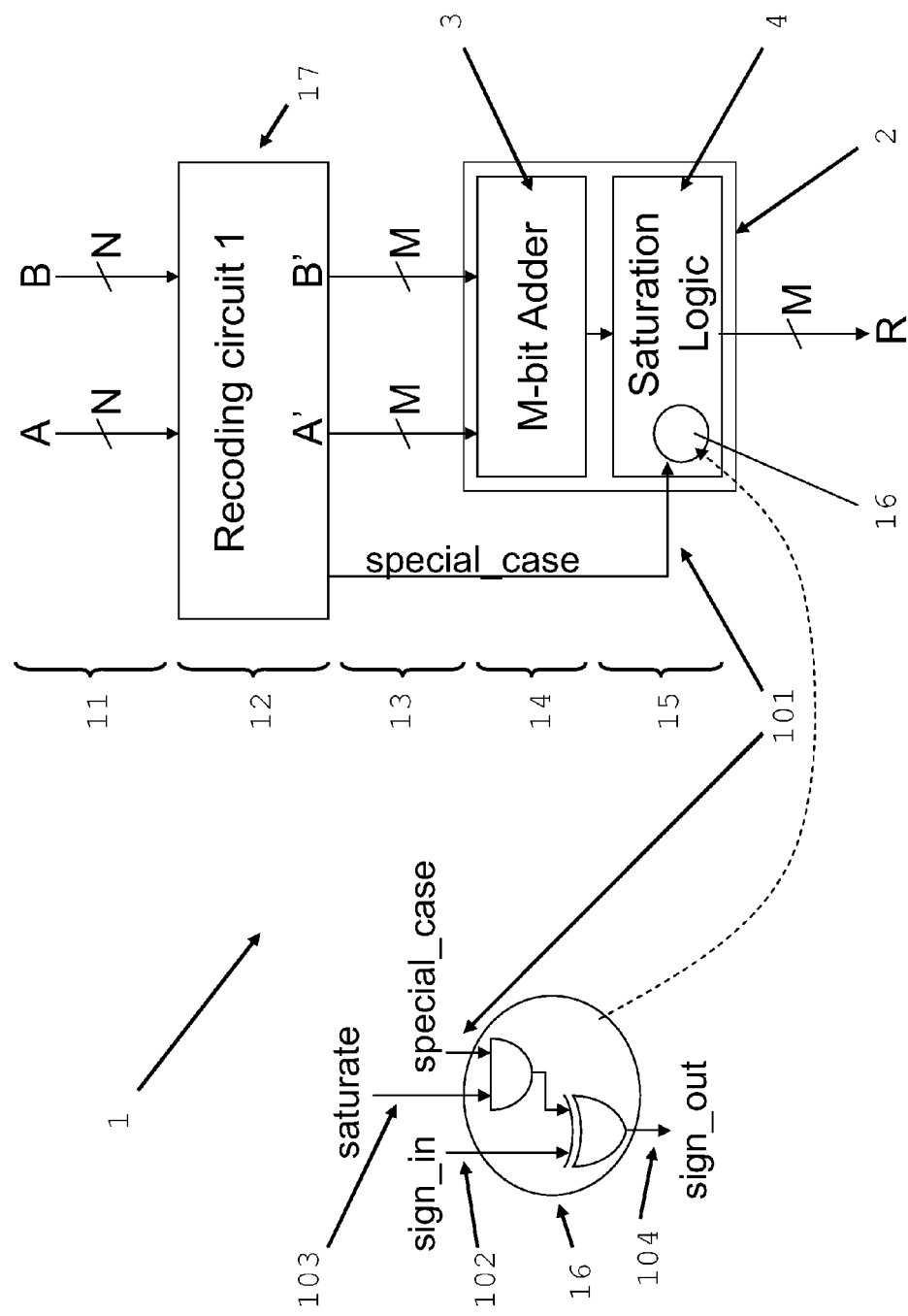

FIG. 1. shows a schematic block diagram representation of a first embodiment of an electronic computing circuit 1 to be used to perform a first method according to the invention.

The electronic computing circuit 1 comprises a recoding circuit 17 and a circuit 16 arranged within a saturation circuit 4 of a saturation adder 2. The recoding circuit 17 processes two N-bit input operands A, B of a bit width of N and generates two M-bit output operands A', B' of a reduced bit width of M in a way, that a post-processing performed on said two M-bit output operands A', B' by the saturation adder 2 provides an M-bit result equal to the M-bit result of an N-bit modulo addition of the two N-bit input operands A, B followed by an saturation to M bits. The saturation adder 2 comprises an M-bit adder 3 and the saturation logic 4 in order to perform an M-bit adder function followed by saturation to M bits.

In a first step 11 two N-bit input operands A, B with a bit width N are received as input.

In a second step 12, the two N-bit input operands A, B are recoded by a recoding circuit 17 to two M-bit output operands A', B'. The recoding circuit performs the following function. The two input operands A, B are sign extended by one bit. The (N−M+1) most significant bit (MSB) of the two sign extended operands are added. Based on the result of this addition and the MSB of the input operands A, B, the two MSB of the M-bit output operands A', B' are computed and a special saturation case is detected. The M−2 least significant bits (LSB) of the input operands A, B are copied to the output operands A', B'. In addition based on the two MSB of the input operands A, B the special saturation case is computed and outputted as a special case control signal 101.

In a third step 13, the manipulated output operands A', B as well as a special case control signal 101 are provided to the saturation adder 2.

In a fourth step 14, the manipulated output operands A', B are added together with the common M-bit adder 3 within the saturation adder 2.

In a fifth step 15, the result of the M-bit adder 3 is saturated. For this the saturation circuit 4 is used. The saturation circuit 4 is a modified state-of-the-art saturation circuit. The modification is a circuit 16 allowing handling special saturation cases indicated by the special case control signal 101. The circuit 16 inverts the sign 102 of the addition result only if the saturation circuit 4 indicates that saturation is needed by activating the signal 103 and if the special case signal 101 is active. The output sign 104 of the circuit 16 is then used by the state-of-the-art part of the saturation circuit 4.

Figure 2:
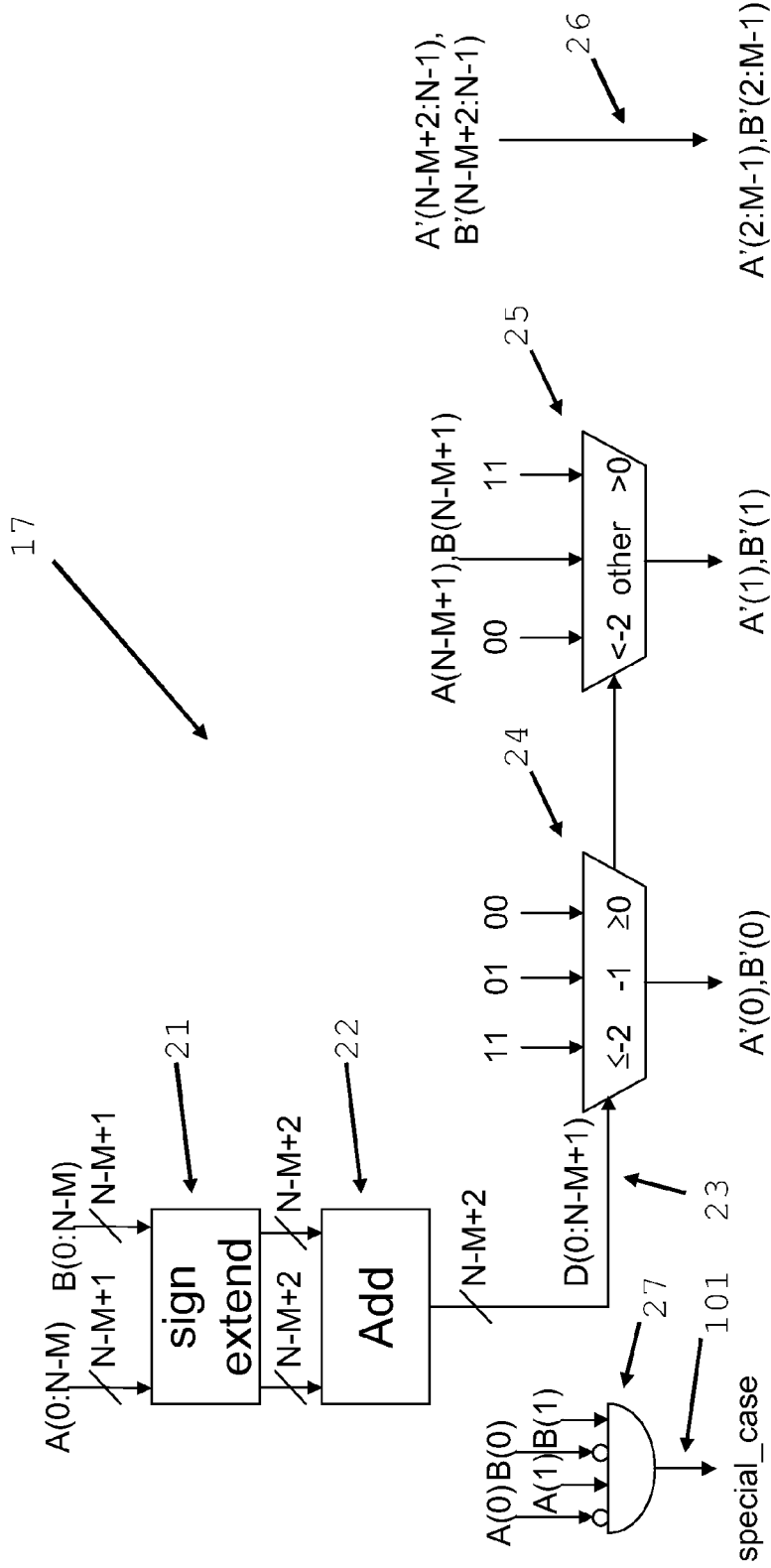

FIG. 2 shows the recoding circuit 17 of the electronic computing circuit 1 in FIG. 1 in detail. The bits of all busses are numbered from 0 starting with the MSB. The N−M+1 MSB of the input operands A and B of the circuit 17 are sign extended by one bit in the circuit 21. The sign extended outputs of circuit 21 are then added together in circuit 22, resulting in the N−M+2 bit wide sum 23.

Based on the value of 23, interpreted as signed integer, the multiplexer 24 computes the output signals of circuit 17 A' (0) and B' (0). If the value of 23 is smaller than or equal to −2, A' (0) and B' (0) are both set to 1. If the value of 23 is equal to −1, A' (0) is set to 0 and B' (0) is set to 1. If the value of 23 is larger than or equal to 0, A' (0) and B' (0) are both set to 0.

The multiplexer 25 computes the outputs A' (1) and B' (1) based on the value of 23 and the input bits A(N−M+1) and B(N−M+1). If the value of 23 is smaller than −2, A' (0) and B' (0) are both set to 0. If the value of 23 is larger than 0, A' (0) and B' (0) are both set to 1. In all other cases, A (0) is set to the value of A(N−M+1) and B' (0) is set to the value of B(N−M+1).

The wire 26 copies the inputs A(N−M+2:N−1) to the outputs A' (2:M−1) and the inputs B(N−M+2:N−1) to the outputs B (2:M−1). The gate 27 activates the signal 101 of FIG. 1 if the inputs A(0:1) and B(0:1) are both equal to '01'.

In FIG. 3 a table is given to describe the relation between signal 23 and the output operands A' and B', based on the input operands A and B. In the first column five value ranges for signal 23 are given.

In each row the appropriate values for operand A' (0), A' (1), A' (2:M−1) and operand B' (0), B' (1), B' (2:M−1) is given. This may include beside 0 and 1 a bit or bits of the input A and B. The multiplexer 24, 25 and 26 of FIG. 2 represent one possible implementation of this table.

Figure 4:
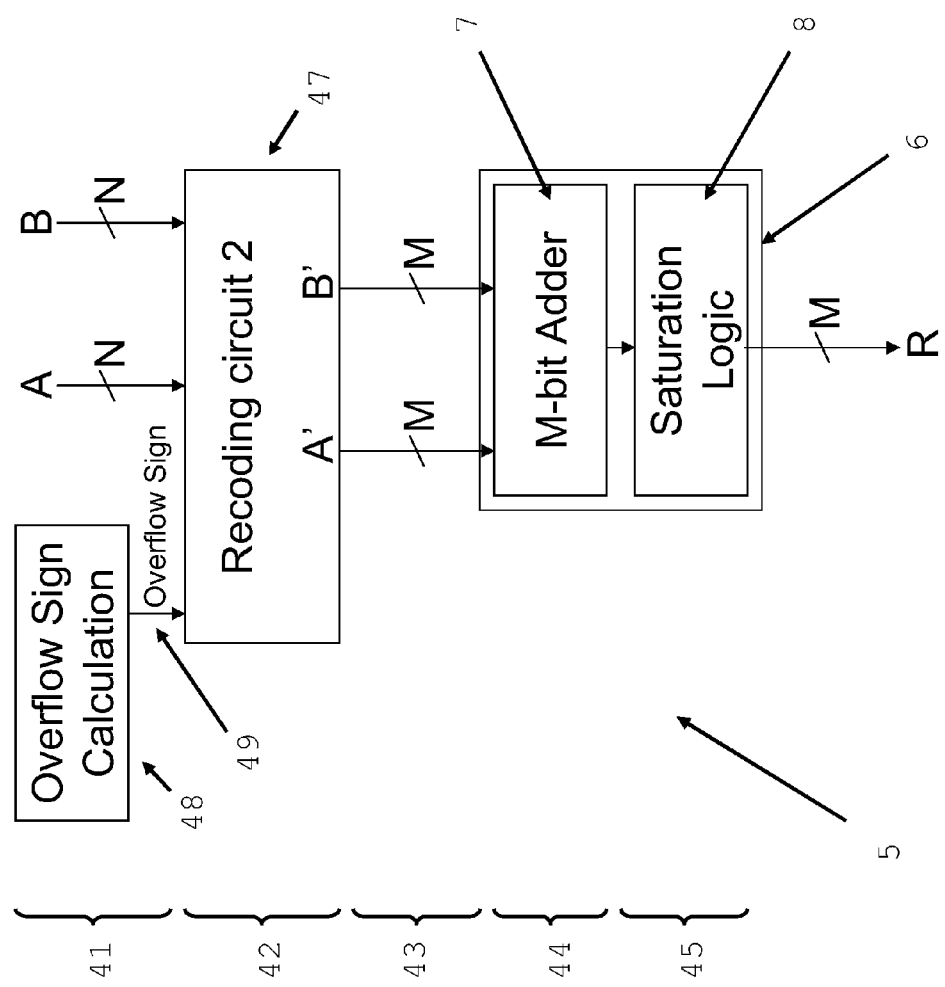

FIG. 4. shows a schematic block diagram representation of a second embodiment of an electronic computing circuit 5 to be used to perform a second method according to the invention. The electronic computing circuit 5 comprises a recoding circuit 47 and an overflow sign calculation circuit 48. Also the recoding circuit 47 processes two N-bit input operands A, B of a bit width of N and generates two M-bit output operands A', B' of a reduced bit width of M in a way, that a post-processing performed on said two M-bit output operands A', B' by a saturation adder 6 provides an M-bit result equal to the M-bit result of an N-bit modulo addition of the two N-bit input operands A, B followed by an saturation to M bits. The saturation adder 6 comprises an M-bit adder 7 and the saturation logic 8 in order to perform an M-bit adder function followed by saturation to M bits.

In a first step 41 the external overflow sign calculation circuit 48 computes an overflow sign signal 49 that indicates the sign of the result in case of an overflow. Also, two N-bit input operands A, B with a bit width N are received as input.

In a second step 42, the two N-bit input operands A, B are recoded using the signal 49 by the recoding circuit 47 to two M-bit output operands A', B'. The recoding circuit performs the following function. The two input operands A, B are sign extended by one bit. The (N−M+1) MSB of the two sign extended operands are added. Based on the result of this addition, the overflow sign signal 49, and the MSB of the input operands A, B, the two MSB of the M-bit output operands A', B' are computed. The M−2 LSB of the input operands A, B are copied to the output operands A', B'.

In a third step 43, the manipulated output operands A', B are provided to the saturation adder 6.

In a fourth step 44, the manipulated operands A', B' are added together by the M-bit adder 7 of the saturation adder 6.

In a fifth step 45, the adder result is saturated. For this a state-of-the-art saturation circuit 8 that is also part of the saturation adder 6 is used.

Figure 5:
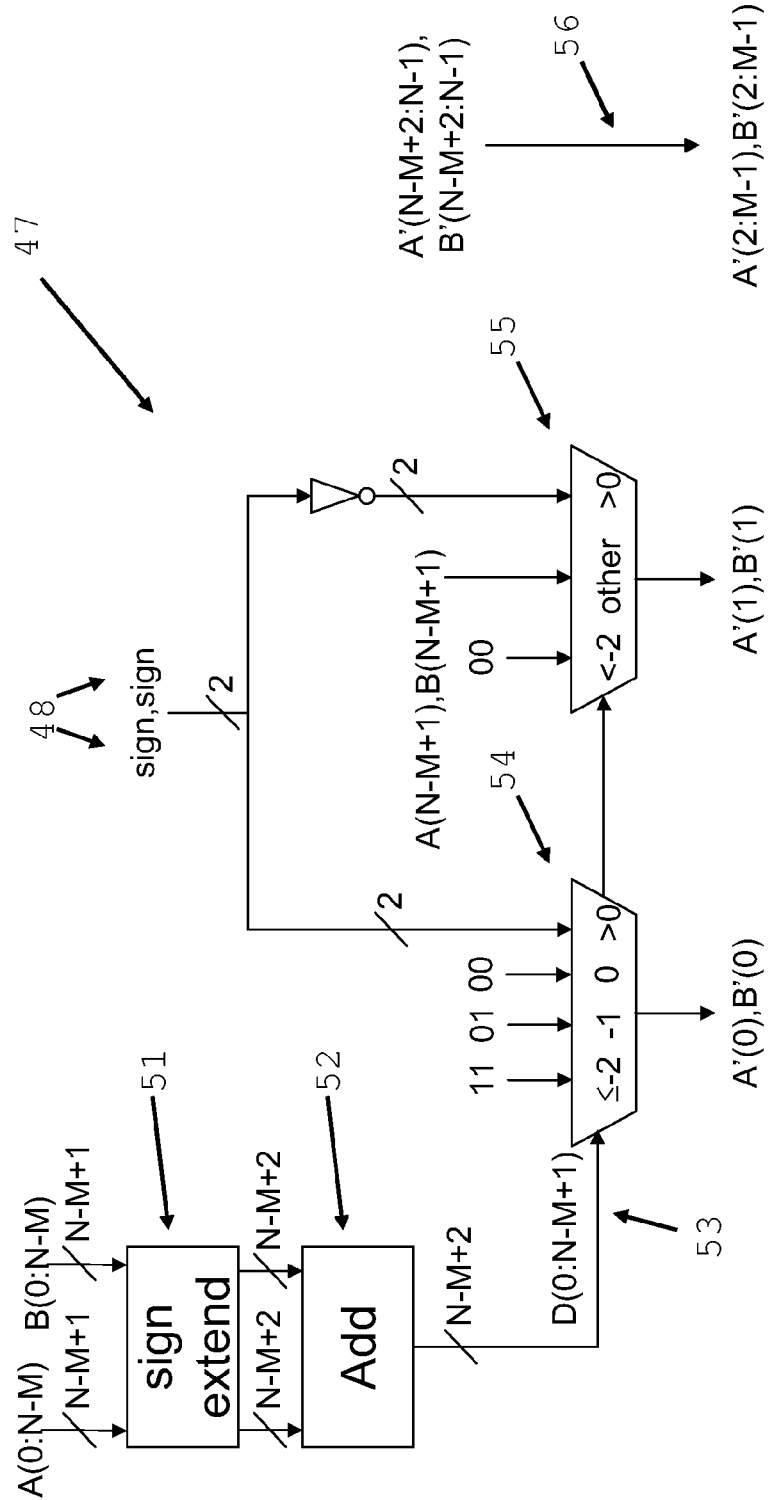

FIG. 5 shows the recoding circuit 47 of the electronic computing circuit 5 of FIG. 4 in detail. The bits of all busses are numbered from 0 starting with the MSB. The N−M+1 MSB of the input operands A and B, of circuit 47 are sign extended by 1 bit in the circuit 51. The sign extended outputs of the circuit 51 are then added together in the circuit 52, resulting in the N−M+2 bit wide sum 53. Based on the value of 53 and the overflow sign signal 49 of FIG. 4, interpreted as signed integer, the multiplexer 54 computes the output signals of circuit 47 A' (0) and B' (0). If the value of 53 is smaller than or equal to −2, A' (0) and B' (0) are both set to 1. If the value of 53 is equal to −1, A' (0) is set to 0 and B' (0) is set to 1. If the value of 53 is equal to 0, A' (0) and B' (0) are both set to 0. If the value of 53 is larger than 0, A' (0) and B' (0) are both set to the value of the signal 49.

The multiplexer 55 computes the outputs A' (1) and B' (1) based on the value of 53 the overflow sign signal 49, and the input bits A(N−M+1) and B(N−M+1). If the value of 53 is smaller than −2, A' (1) and B' (1) are both set to 0. If the value of 53 is larger than 0, A' (1) and B' (1) are both set to the inverted value of the signal 49. In all other cases, A' (1) is set to the value of A(N−M+1) and B' (1) is set to the value of B(N−M+1).

The wire 56 copies the inputs A(N−M+2:N−1) to the outputs A' (2:M−1) and the inputs B(N−M+2:N−1) to the outputs B (2:M−1).

In FIG. 6 a table is given to describe the relation between signal 53 and A' and B', based on inputs A and B and the overflow sign signal 49. In the first column five value ranges for signal 53 are given.

In each row the appropriate values for operand A' (0), A' (1), A' (2:M−1) and operand B' (0), B' (1), B' (2:M−1) is given. This may include beside 0 and 1 a bit or bits of the input A, B or the overflow sign signal 49. The multiplexer 54, 55 and 56 of FIG. 5 represent one possible implementation of this table.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A computer system comprising:
a recoding circuit that receives two N-bit input operands (A, B) having a bit width of N as an input, wherein the recoding circuit recodes the two N-bit input operands (A, B) to two M-bit output operands (A', B') having a reduced bit width of M;
wherein the recoding circuit detects special saturation cases of the N-bit input operands;
wherein the recoding of the two N-bit input operands (A, B) to the two M-bit output operands (A', B') is performed by adding portions of the two N-bit input operands (A, B) together, and wherein based on a result of the addition and one or more bits of the two N-bit input operands (A, B) the two M-bit output operands (A', B') are computed;
wherein the recoding is performed by sign extending the two N-bit input operands (A, B) by one bit and adding (N−M+1) most significant bits (MSB) of the sign extended inputs together;
wherein two MSB of the M-bit output operands (A', B') are computed based on MSB of the two N-bit input operands (A, B) and the result of the addition, and wherein M−2 least significant bits (LSB) of the two M-bit output operands (A', B') are set to M−2 LSB of the two N-bit input operands (A, B);
wherein a control signal is detected based on the two MSB of the N-bit input operands (A, B) and provided to a saturation circuit, and wherein the control signal is used to revert a saturation direction in the saturation logic;
the recoding circuit providing an output comprising the two M-bit output operands (A', B'); and
wherein the two M-bit output operands (A', B') are coupled to an M-bit adder followed by saturation to M bits, wherein the two M-bit output operands (A', B') provide an M-bit result equal to another M-bit result of an N-bit modulo addition of the two N-bit input operands (A, B) followed by a saturation to M bits.

2. The computer system according to claim 1, wherein the control signal indicates a special saturation case to an M-bit saturation adder that calculates a correct M-bit result with a bit width of M while having an additional logic within saturation logic that takes the control signal into account.

3. The computer system according to claim 1, further comprising: external overflow sign calculation logic.

4. A method for operand width reduction, the method comprising:
receiving, by a recoding circuit, two N-bit input operands (A, B) having a bit width of N as an input;
generating, using the recoding circuit, the two M-bit output operands (A', B') from the two N-bit input operands;
detecting special saturation cases for the N-bit input operands (A, B);
providing an output comprising the two M-bit output operands (A', B');
wherein the detection of special saturation cases of the N-bit input operands (A, B) and the generation of the two M-bit output operands (A', B') from the two N-bit input operands (A, B) are performed by recoding of the two N-bit input operands (A, B) to the two M-bit output operands (A', B'); and
wherein the recoding of the two N-bit input operands (A, B) to the two M-bit output operands (A', B') is performed by sign extending the two N-bit input operands (A, B) by one bit and adding the (N−M+1) most significant bits (MSB) of the sign extended inputs together, wherein based on the result of the addition and MSB of the two N-bit input operands (A, B) two MSB of the M-bit output operands (A', B') are computed, wherein M−2 least significant bits (LSB) of the two M-bit output operands (A', B') are set to M−2 LSB of the two N-bit input operands (A, B), wherein the control signal is detected based on the two MSB of the N-bit input operands (A, B) and is used to revert the saturation direction by saturation logic in a saturation circuit.

5. The method according to claim 4, characterized in that detecting special saturation cases for the N-bit input operands (A, B) is performed by a computation of a control signal indicating a special saturation case based on a portion of the N-bit input operands (A, B), wherein providing an output comprising the two M-bit output operands (A', B') also provides the control signal indicating a special saturation case to an M-bit saturation adder, which calculates a correct M-bit result with a bit width of M while having an additional logic within its saturation logic taking the control signal into account.

6. The method according to claim 4, wherein the detection of special saturation cases of the N-bit input operands and the generation of the two M-bit output operands from the two N-bit input operands is performed by an external overflow sign calculation and by a recoding of the two N-bit input operands (A, B) to the two M-bit output operands (A', B'), wherein a portion of the two N-bit input operands (A, B) are added together, wherein based on the result of this addition, the output of an external overflow sign calculation and one or more bits of the two N-bit input operands (A, B) the two M-bit output operands (A', B') are computed, wherein means to provide an output comprising the two M-bit output operands (A', B') is coupled to an M-bit saturation adder, which calculates a correct M-bit result with a bit width of M by processing the two output operands (A', B').

7. The method according to claim 6, wherein the detection of special saturation cases of the N-bit input operands and the generation of the two M-bit output operands from the two N-bit input operands is performed by an external overflow sign calculation and by a recoding of the two N-bit input operands (A, B) to the two M-bit output operands (A', B'), wherein the two N-bit input operands (A, B) are sign extended by one bit and (N−M+1) MSB of the sign extended inputs are added together, wherein based on a result of the addition, an output of the external overflow sign calculation, and the MSB of the two input operands (A, B), two MSB of the M-bit output operands (A', B') are computed, wherein the M−2 LSB of the two output operands (A', B') are set to the M−2 LSB of the two input operands (A, B).

* * * * *